Figure 4:
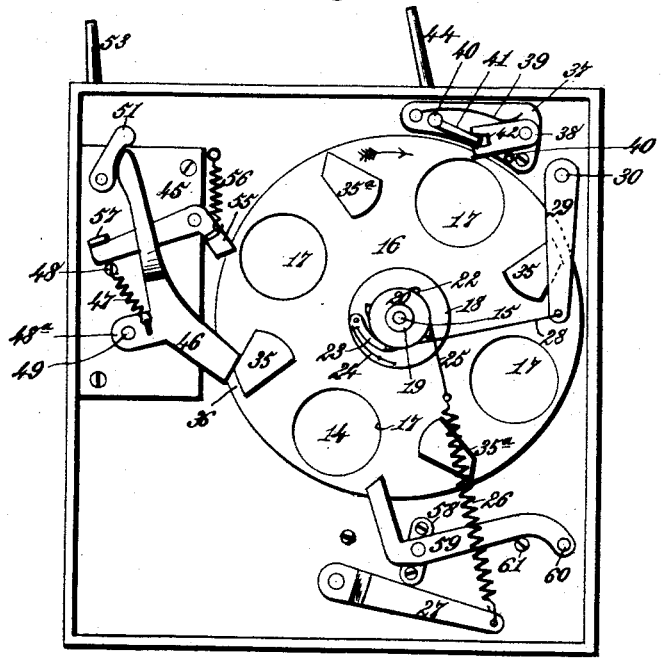

(No Model.)  4 Sheets—Sheet 1.
E. W. PERRY, Jr.
PHOTOGRAPHIC CAMERA.
No. 438,944.  Patented Oct. 21, 1890.
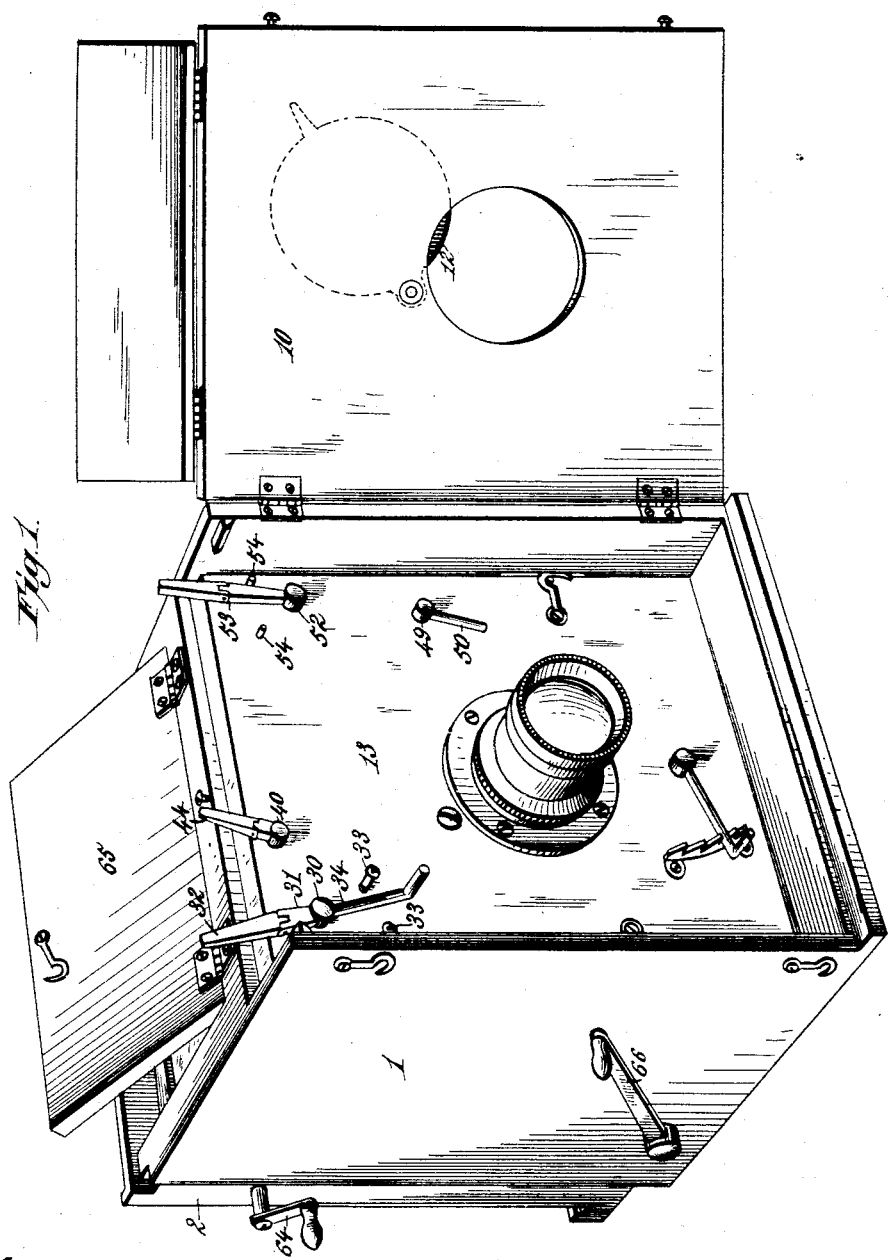
Witnesses,
Robert Curdt
J. A. Rutherford
Inventor:
Enoch W. Perry, Jr.
By James L. Norris,
Atty.

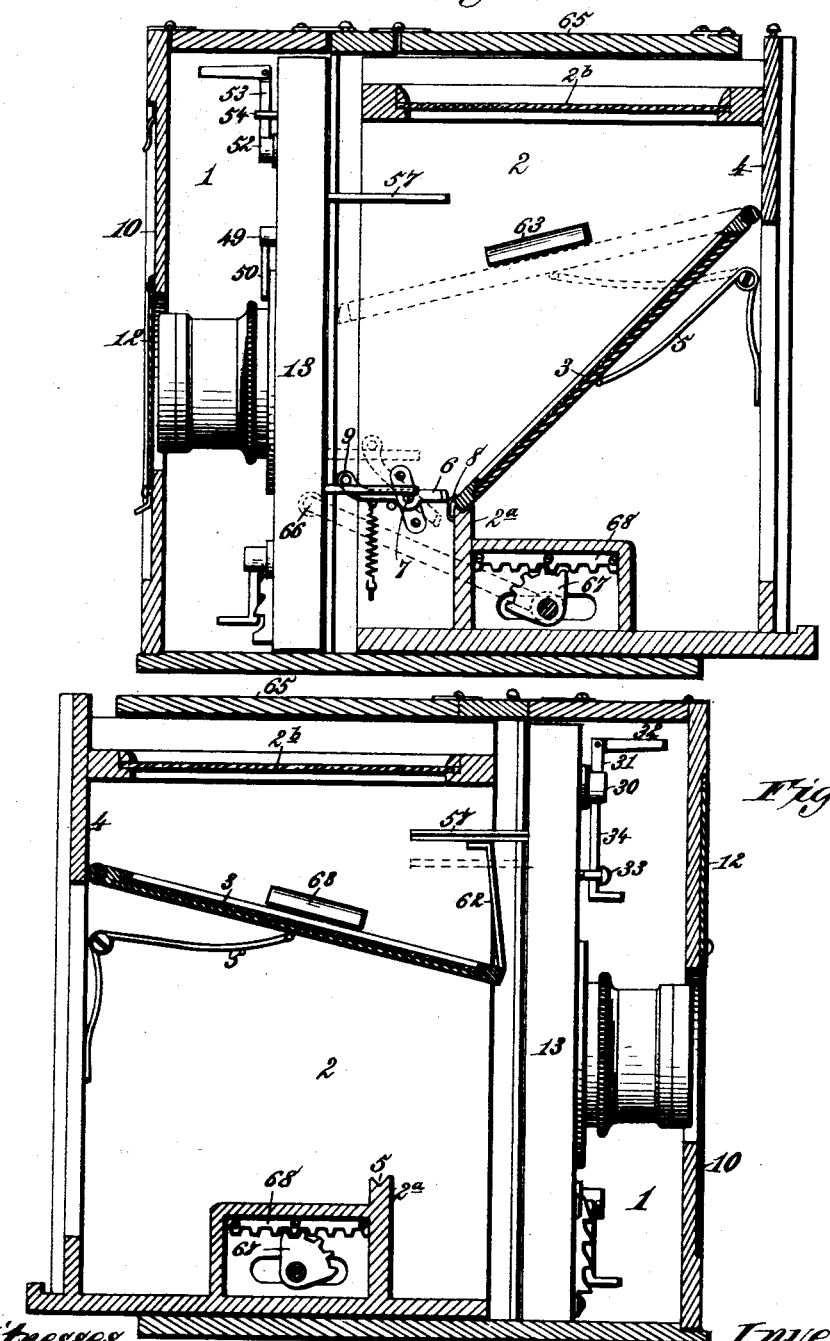

(No Model.)  4 Sheets—Sheet 3.

E. W. PERRY, Jr.
PHOTOGRAPHIC CAMERA.

No. 438,944.  Patented Oct. 21, 1890.

Witnesses:
Inventor:
Enoch W. Perry Jr.
By James L. Norris,
Atty.

(No Model.) 4 Sheets—Sheet 4.

E. W. PERRY, Jr.
PHOTOGRAPHIC CAMERA.

No. 438,944. Patented Oct. 21, 1890.

Witnesses,
Robt Emett
J A Rutherford

Inventor,
Enoch W. Perry Jr.
By James L. Norris,
Atty.

UNITED STATES PATENT OFFICE.

ENOCH WOOD PERRY, JR., OF NEW YORK, N. Y., ASSIGNOR OF ONE-HALF TO EMIL KIPPER, OF ADAMS, MASSACHUSETTS.

PHOTOGRAPHIC CAMERA.

SPECIFICATION forming part of Letters Patent No. 438,944, dated October 21, 1890.

Application filed June 7, 1890. Serial No. 354,646. (No model.)

*To all whom it may concern:*

Be it known that I, ENOCH WOOD PERRY, Jr., a citizen of the United States, residing at New York, in the county of New York and State of New York, have invented new and useful Improvements in Photographic Cameras, of which the following is a specification.

It is the purpose of my invention to provide means whereby an upright image may be focused in a camera upon a ground-glass screen during the time the sensitive plate or film is in place, ready for exposure, without requiring the use of a slide in the plate-holder or other means for protecting the plate or film from the action of light.

It is my purpose, also, to provide a shutter which may be used for either time or instantaneous exposure without any material changes in the mechanism employed, the construction and arrangement being such that the various latches or stop-levers may readily be arranged to effect either result automatically in accordance with the manner in which the parts are set to act, whether the same be for instantaneous or time exposure.

It is a further purpose of my said invention to combine with the focusing-screen a pivotally-mounted mirror reflecting the image upon the mirror and thence upon the screen of ground glass, upon which it is seen of the same size in which it will appear when produced upon the plate, and in an upright instead of an inverted position, the mirror being set for focusing and released for exposure by means arranged outside the camera, whereby a dark-box may be formed in rear of the inclined mirror.

It is my purpose, also, to provide a camera in which the focal adjustment may be made while the unprotected plate is in position for exposure, said camera being provided with a pivotal focusing-mirror, which forms, in conjunction with a rest or bracket receiving its free end, a dark-box, in which the plate or sensitive film is placed without requiring a slide in the plate-holder or other protection against light, complete protection being afforded during the period of focusing by the inclined mirror and its supporting-bracket.

It is my further purpose to combine with the parts last specified means for raising the mirror to expose the sensitized film or plate and to drop or lower said mirror in order to form the dark-box, the mirror being lifted to effect exposure by automatic devices and released by a latch or trigger operated by a lever on the lens-plate of the camera, which is tripped by one or more cam-lifts upon a shutter moving on said lens-plate.

It is my purpose, in short, to provide a camera wherein the focusing may be effected by means of a mirror having an angular arrangement with reference to a ground-glass screen, and wherein the dark-box is formed by said mirror in its focusing position, and to combine therewith means whereby the release of the automatically-impelled shutter shall release said mirror and allow it to lift before the lens-opening is uncovered by the shutter.

Finally, it is my purpose to provide a shutter operated entirely from the outside, wherein by a simple adjustment of one of the parts the action may be converted from a time to an instantaneous exposure, and vice versa.

My invention also comprises certain details of construction and new combinations of parts, whereby I am able to effect a material economy of space and secure a great simplicity and certainty of operation; and the improvement consists in the novel parts and combinations of parts hereinafter fully set forth, and then definitely pointed out in the claims annexed to this description.

To enable others skilled in the art to practice my said invention, I will now proceed to describe the same in detail, reference being had to the accompanying drawings, in which—

Figure 5:
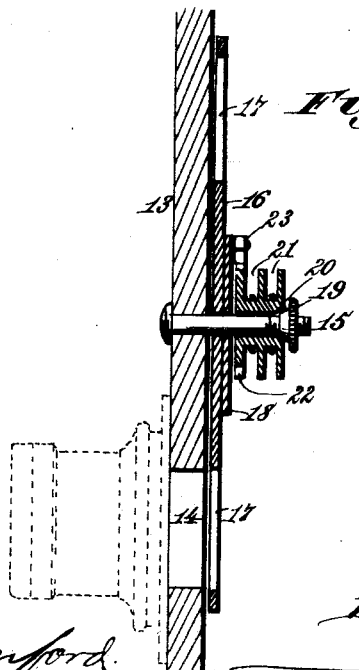
Figure 6:
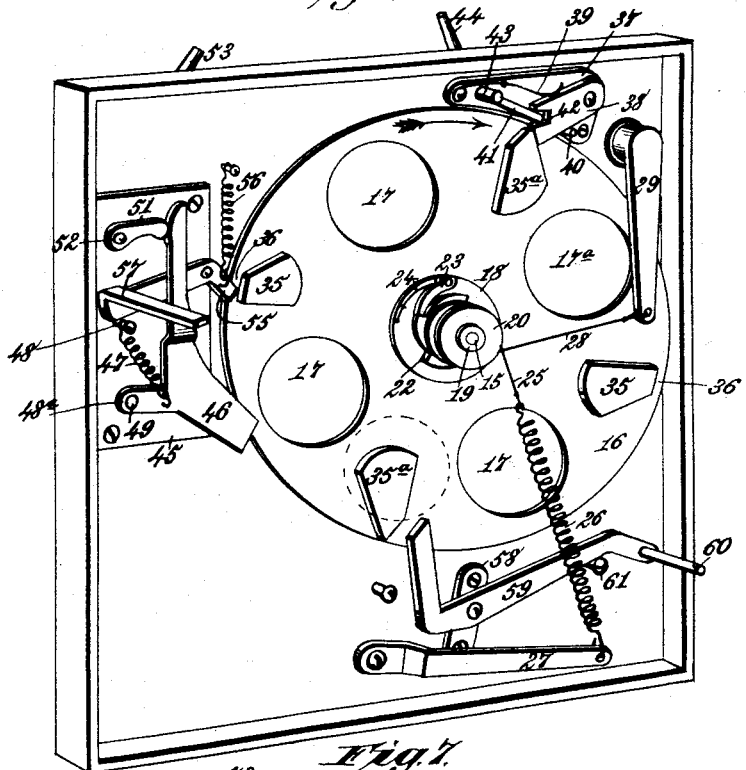
Figure 7:
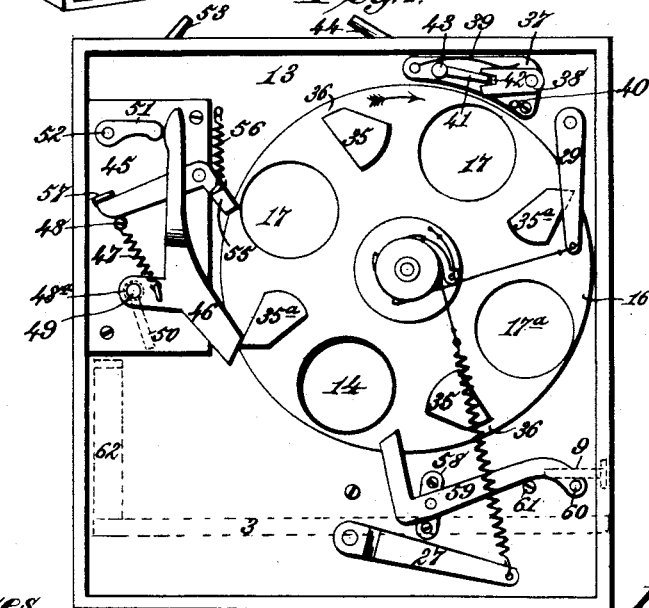

Figure 1 is a perspective view of the entire camera-box, the front being thrown open to show the lens-plate. Fig. 2 is a central vertical section, the point of view being from the left-hand side of the camera. Fig. 3 is a similar section, the point of view being upon the opposite side of the machine. Fig. 4 is an elevation of the rear face of the lens-plate, the parts being arranged for time exposure. Fig. 5 is a vertical section through the axis of the shutter. Fig. 6 is a detail perspective of the inner face of the lens-plate, showing the shutter in initial position. Fig. 7 is an elevation of the parts shown in Fig. 6, showing the release of the shutter and its arrest at the point where the lens is opened for focusing, the parts in both Figs. 6 and 7 being set for instantaneous exposures.

In the said drawings, the reference-numeral 1 denotes the camera-box, which is provided with an interior casing 2, painted or stained a dead black. This casing forms the inner and adjustable focusing-section of the camera-box when the latter is manufactured in the manner shown; but it is equally feasible to use a single box and obtain the focusing adjustment in other ways. Upon the floor or bottom portion of this casing is formed a support 2ª transverse to the box and rising to a point below the lowest level of the lens-opening. At or near the rearward upper angle of the box is pivotally mounted a mirror 3, set in a black frame 4 and normally raised by a spring or springs 5 or other suitable means, the edge of the free end of said mirror seating in an angular groove in the upper edge of the support 2ª. When the mirror is lowered, it is held down with its angular edge in the groove by a spring-latch 6, pivoted upon a stud 7 on the wall and having bearing at its end upon a wear-plate 8 upon the end of the mirror-frame. This latch may, if desired, be duplicated at both ends of the support 2ª; but a single latch will usually be sufficient. Upon the end of the latch-arm 6 is mounted an arm 9, lying at right angles, or approximately so, thereto, the purpose of which will be presently shown. At the rear of the box any suitable means are provided for the vertical support of the sensitive plate or film, which may be mounted in any suitable holder, but which requires no slide during the period of focusing.

The front plate 10 of the camera-box is usually, though not necessarily, hinged, that it may be thrown open, and upon this front I may, if desired, mount a pivotal shield 12 to protect the interior from dust. Within the front of the box is arranged a removable lens-plate 13, which substantially fills the rectangular space and is stained or painted a dead black, although it may be formed of material which is normally of that color. The lens-opening 14 is substantially central in this plate and may be provided with any known device for adjusting the diameter of the focal aperture.

Journaled upon a stud 15 upon one side of the lens-opening 14 is a circular disk 16, which may be formed of hard rubber, metal, or any other suitable material having a black color, either natural or imparted thereto artificially. This disk is provided with one or more openings 17 of any suitable shape or size and at substantially equal distances apart, if more than one opening is employed. I have shown in the present instance four circular openings; but I may use any number required, and I do not limit myself, therefore, to any specified number. The openings 17 are so arranged with reference to the position of the stud upon which the disk is mounted that as the latter revolves their openings will successively coincide with the lens-opening 14 in the lens-plate. This disk, which will hereinafter be termed the "shutter," is rotated upon its stud or axis 15 in the manner following: Centrally and rigidly mounted upon the face of the shutter is a metallic plate 18, between which and a collar 19 on the end of a stud 15 is loosely journaled a spool or pulley 20, having two separate grooves 21. The inner flange of the spool is provided with notches 22, (one or more,) and upon the plate 18 is mounted a pawl 23, which is thrown by a spring 24 into engagement with said notches. To the periphery of the spool is attached the end of a chain, cord, or wire 25, which winds and unwinds in one of the grooves or channels of the spool. Its other end is secured to the one end of a spring 26 of any suitable form, the other end of said spring being connected to a bracket 27, mounted on the lens-plate. In like manner a similar chain or cord 28 is attached to the spool, winding in the other channel and in a direction opposite to that of the chain 25. The other end of this chain 28 is attached to a lever 29, fulcrumed upon a support 30, which passes entirely through the lens-plate to the outside thereof. Upon the outer end of this support, which projects beyond the front face of the lens-plate, is formed or mounted a short arm 31, to the end of which is hinged an arm 32 in such manner that the latter can be turned up into line with the short arm 31, forming practically a part of the lever 29, to increase the acting distance of the latter, while it may be turned down into a substantially-horizontal position to enable all the parts to be contained within the hinged front of the camera-box when the latter is closed. By operating the lever 29 the chain or cord attached thereto will be put under tension and the spool 20 will be revolved, thereby setting the shutter and imparting a tension to the spring 26'. As the winding of the chain or cord is completed, the pawl 23 snaps into one of the notches 22 in the flange of the spool. The swing of the lever 29 is limited in both directions by stops 33 on the outer face of the lens-plate, between which swings a hanger 34, mounted on the bearing 30. At its lower end this hanger has a short arm turned outward, whereby the lever may be operated, if preferred.

I do not confine myself to the grooved spool or chain or cord for setting the shutter, as other mechanical contrivances can be employed—such, for example, as the devices exhibited in my application filed May 31, 1890, No. 353,751.

The shutter 16 invariably revolves in the same direction, which is indicated by the arrow. Between the circular openings 17 are rigidly mounted or formed stops 35, two of which (designated by the numeral 35ª) have their points continued to or very nearly to the periphery of the shutter, while the two remaining stops 35 have these points trimmed off in substantial parallelism with the edge of the shutter, leaving a comparatively broad space 36, the purpose of which will be shown presently.

Upon the inner face of the lens-plate, just outside the periphery of the shutter, is mounted a plate 37, of substantially equal thickness with the shutter, and upon this plate is pivotally mounted a latch or dog 38, which is normally thrown by a spring 39 against a stop-pin 40, in which position its end lies over the face of the shutter far enough to cover the space 36, comprised between the edge of the shutter and the outer ends of the stops $35^a$, whereby the latter will pass the latch or dog without contact. The latch is raised against the tension of the spring 39 by a lever 41, the end of which lies in a notch 42 in the end of the latch, the lever having a pivotal fulcrum 43, which passes through and projects from the front of the lens-plate. Upon the outer projecting end of this pivot is mounted a hinged arm 44, which may be thrown into a position at right angles with the axis of the fulcrum and used to lift the latch, the construction being substantially the same in this respect as in the case of the hinged arm on the lever 29. This latch or dog is located at any suitable point on the lens-plate, having a certain definite relation in its position to another dog or latch, which will now be described. Upon the inner face of the lens-plate is a plate 45, upon which is pivotally mounted a latch 46, its end overhanging the surface of the shutter. The end of the latch 46 is drawn inward toward the axis of the shutter by a spring 47, having one end attached to a pin 48, mounted on the plate 45. The axis $48^a$ of the said latch is mounted upon a rearwardly-projecting arm 49, which is carried through the lens-plate and projects far enough upon its front to receive a depending arm 50, by which the dog may be operated. Behind the upper end of the dog is a cam 51, pivoted upon an axis 52, projecting entirely through the lens-plate, and provided with a lever 53, which may be centrally hinged to enable it to be turned up and down. This lever swings between stops 54, by which its movement is limited. Upon the upper portion of the plate 45 is an angularly-shaped latch 55, having one end extending slightly over the edge of the shutter, but only far enough to engage the points of the stops $35^a$, which project to the edge of the shutter. The engaging end of the dog is normally lifted by a spring 56, its other end being arrested by striking against the pin 48. Projecting from the extremity of the arm most remote from the shutter is an arm 57, standing at right angles, or substantially so, with said dog, the function of which will presently be explained. The upper end of the dog 46 overhangs the rearward portion of the dog 55, being bent slightly outward for that purpose to enable the end of the dog 46 to be reached by the cam. Below the shutter is pivotally mounted upon a plate 58 an elbow or bell-crank lever 59, the longer arm of which carries a tripping-pin 60, which is parallel with the axis of the pivot-pin of said lever and is thrown by gravity against a stop-pin 61, in which position the point or end of the other arm overlies the shutter sufficiently to engage each of the stops thereon as the shutter rotates and thereby lift the tripping-pin 60. The lens-plate, having these parts arranged in the manner described, is placed at the front of the camera-box, where it may be fastened, if desired, by any means rendering it detachable in order to permit its ready removal should repairs at any time be required or for any other purpose.

I have already explained the construction of the focusing-casing within the box and the construction and pivotal mounting of the focusing-mirror, together with the means for lifting the mirror when exposure is to be made. When the lens-plate is in place, the tripping-pin 60 will lie directly beneath the arm 9 on the latch, which holds the mirror in its focusing position. Upon the opposite side of the mirror is mounted a nearly-vertical arm 62, which lies directly in line with and beneath the end of the arm 57 on the dog 55. Upon the side walls of the casing are placed inclined arms 63, which arrest the upward swing of the mirror.

The operation of the devices thus far described is as follows: The lens-plate being in place in the camera, the mirror is thrown down and fastened, its depressing being accomplished by means of a crank or lever arm 64 upon the axis of the mirror and operated from the outside of the dark-box. The first step now is to operate the shutter in such manner as to uncover the lens-opening and still preserve the mirror in its inclined position until the exact focus is obtained upon the ground-glass screen $2^b$. To accomplish this the operator raises the lid 65 on the camera-box and discloses the ground-glass screen $2^b$. He then operates the lever 29, rotating the spool 20, and placing the chain attached to the spring 26 under tension, when one of the stops $35^a$ will rest against the latch 38 and arrest the movement of the shutter. In this position the lens-opening is closed by the solid intermediate portion of the shutter. The operator now touches the arm 44, pressing it downward, and thereby raising the dog or latch 38 until the shutter is released, whereupon it makes a quick revolution in the direction of the arrow until the other and opposite stop $35^a$ engages the end of the latch or dog 46, by which the shutter is arrested. The lens-opening is now disclosed and the object is focused by any suitable means—as, for example, a lever 66, pivoted on the box 1 and having a gear 67, connecting with the rack 68 on the casing 2. The image is seen upon the ground-glass screen and in its normal position instead of being inverted. Let it be supposed now that the operator has decided to make a time exposure. It will be noted that in opening the lens for focusing the bell-crank lever 59 is not operated, inasmuch as the shutter does not travel far enough to bring one of the stops 35 or 35ª against its point. Thus while the partial movement of the shutter brings one of its circular openings into coincidence with the lens-opening the mirror is not disturbed, but remains in its inclined position, throwing or reflecting the image upon the ground-glass screen. When the focusing is completed in the manner described, a further movement of the shutter is necessary in order to trip the latch releasing the mirror by the action of the bell-crank 59 and to produce a sufficient rotation of the shutter to cause one of its openings to coincide with the lens-opening after the end of the mirror has risen above the same, thereby giving exposure to the plate for any period desired, and this is effected by a movement of the lever or arm 50, whereby the latch 46 is moved far enough to permit the escape of one of the cam-stops 35, resting against the end of the latch 46. In making the time exposure the cam 51 is thrown upward, in order that the lower end of said latch 46 may swing in as far as possible toward the axis of the shutter. Having operated the lever 50 in the manner set forth, the shutter is again released, and upon its release not only is the bell-crank lever 59 operated by one of the stops 35ª, thereby tripping the latch holding the mirror and permitting the latter to fly upward, but, moreover, the upward swing of the mirror brings the arm 62 carried thereby into contact with the arm 57, by which the latch 55 is operated in such manner that the cam-stop 35 is released from the latch 55, which would otherwise have caused the permanent arrest of the shutter, and the shutter then passes by such latch until the succeeding stop 35ª engages the end of the latch 46, which, by reason of its immediate release after the dog 35 had been set free from it, has sprung back in time to engage this succeeding stop 35ª, thus bringing one of the openings in the shutter into coincidence with the lens-opening. After the proper exposure has been made the operator simply operates the arm 50 a second time, releasing the stop 35ª, which was caught by the end of the dog 46, thereby bringing the stop 35, which escaped from its contact with the latch 55, into engagement with the dog or latch 38, whereby the camera is closed. Let it now be supposed that an instantaneous exposure is desired. In this case the focusing of the image is effected in the manner already set forth. The cam 51, however, is thrown downward or into a substantially horizontal position in order that the lower end of the latch or dog 46 may be so far withdrawn from the face of the shutter that the stops 35ª will clear the end of said latch. Having obtained the focus, the operator simply throws the lever 50 far enough to release the stop 35, which has engaged the extreme angle of the dog or latch 46, in order to open the lens for focusing, whereupon the shutter is again released and the bell-crank lever is operated to trip the latch holding the mirror down. The rise of the mirror proceeds far enough to bring its end above the top of the lens-opening just as its arm 62 strikes the arm 57, by which the latch 55 is drawn off the face of the shutter and the cam-stop 35 is allowed to pass until it reaches the latch or dog 38. The shutter thus makes a sufficient revolution to carry the opening, which I will designate, for illustration, by the numeral 17ª, over the lens-opening and bring the succeeding solid part of the shutter into position to close said opening.

It will be understood, of course, that upon making a second instantaneous exposure the opening diametrically opposite will give the flash or instantaneous admission of light, there being two distinct actions for each complete revolution of the shutter when the latter contains four openings.

It will be seen that the parts are so organized that in every case the mirror is released and raised so far above the lens-opening as to afford no impediment to the admission of light at the time the lens-opening is uncovered by the shutter. In every case the device tripping the mirror is operated at the instant the shutter has closed the opening through which the focus was taken, and the arm 62 on the mirror does not engage the arm 57 on the dog or latch 55 until the mirror has risen nearly to its full height. Thus in both time and instantaneous exposures the image is cast directly upon the sensitive film or plate without any interruption.

It will be understood that this shutter is used in connection with any magazine plate-holder which is suitable for the conditions required—for example, such as exhibited in Letters Patent Nos. 422,804 and 424,315; but obviously I do not confine myself to any particular plate-holder.

What I claim is—

1. In a photographic camera having a ground-glass screen, the combination, with a mirror arranged under the screen and adapted to rise when released, of a shutter mounted upon the lens-plate and a device actuated by the shutter to release the mirror, substantially as described.

2. In a photographic camera, the combination, with a ground-glass screen, of a spring-lifted mirror, a locking device holding the same at the required angle to said screen, the end of the inclined mirror resting upon a transverse support and forming a dark-box in rear thereof, a lens-plate having a shutter provided with an opening or openings adapted to coincide with the lens-opening, means for imparting motion to said shutter, and a lift or lever operated thereby to release the locking device by which the mirror is held down, the movement of the parts being timed to release and raise the mirror before the lens-opening is disclosed by an opening in the shutter, substantially as described.

3. In a photographic camera having a ground-glass screen, the combination of a focusing spring-raised mirror pivoted at one end in the rear of the box and its end resting in a groove or channel in the top of a transverse support or wall to form a dark-box in rear thereof, a latch locking the mirror, a lens-plate having a mechanically-moved shutter provided with one or more openings adapted to coincide with the lens-opening by the movement of the shutter, and a lever pivoted on the lens-plate and having an arm on one end engaged by cam-stops on the shutter and provided upon its other end or arm with means for engaging and releasing the latch which locks the mirror in its adjusted position, substantially as described.

4. In a photographic camera having a ground-glass screen and an inclined focusing-mirror held in position by a suitable locking device and raised when released by one or more springs, the combination of a revoluble shutter having openings which coincide successively with the lens-opening, a lever pivoted upon the lens-plate outside the shutter and having one end lying normally in the path of a series of stops upon the face of the said shutter, its other end engaging the locking device which holds the mirror in its inclined position, means for revolving the shutter, and dogs or latches for releasing and arresting the revolution of the shutter at proper intervals, substantially as described.

5. In a photographic camera having a ground-glass screen, the combination, with a focusing-mirror pivoted in the adjustable box or casing and adapted to be inclined at a proper angle to said screen, of a circular shutter having a series of openings which coincide successively with the lens-opening, a lever pivoted on the lens-plate and having one arm lying in the path of stops arranged on the face of the shutter between its openings, its other end engaging the locking device which holds the mirror in its focusing position, means for revolving the shutter in one direction, a pivoted latch or dog holding it in initial position and releasing it to disclose the lens-opening without releasing the mirror, an independent latch releasing the mirror and closing the lens-opening instantaneously, and a separate latch operated automatically by an arm on the rising end of the mirror and withdrawing said latch from the path of the stops by which the lens is opened for time exposure, the same being closed by a further action of the independent latch, whereby also the shutter is returned to its original position, substantially as described.

6. In a photographic camera, the combination, with a rising and falling focusing-mirror locked in its inclined position by a latch, of a lens-plate, a circular shutter pivoted centrally thereon and having a series of openings which successively coincide with the lens-opening, a lever releasing the spring-raised mirror and actuated by cam-stops on the shutter, a latch or dog pivoted on the lens-plate and engaging one of the cam-stops to hold the shutter in its initial position to close the lens-opening and adapted to release the shutter, a second latch arresting the shutter in focusing position, but without releasing the mirror, said latch also releasing the shutter, by the further movement of which the lever releasing the mirror is operated, and a third latch automatically operated by an arm on the rising mirror and allowing the cam-stop released by the second latch to pass, thereby causing the arrest of the shutter by the engagement of one of the cam-stops with its end to open the lens for time exposure, substantially as described.

7. In a photographic camera, the combination, with an adjustable focusing-box having a transverse support, of a swinging spring-raised focusing-mirror, a latch locking the free end of said mirror upon said transverse support and at an angle to the ground glass screen above, a lens-plate, an angular lever pivoted on said plate and provided with an arm which lies beneath an arm on the latch releasing the mirror, a shutter journaled on the lens-plate and having openings coinciding with the lens-opening, and provided also with cam-stops upon its outer face between the openings which engage the end of the angular lever to trip the same and release the mirror, and latches arranged at proper points to arrest and subsequently release the shutter, substantially as described.

8. In a photographic camera, the combination, with a lens-plate, of a rotary shutter having a series of openings at equal intervals adapted to coincide successively with the lens-opening, said shutter being also provided with cam-stops between said openings, every other stop having its point or end extending to the edge of the shutter, and the remaining number set back or trimmed off, to provide a space between their ends and the edge of the shutter, a first latch or dog pivoted on the lens-plate and overlying the edge of the shutter far enough to engage the stops projecting to the edge of the shutter, but not the others, a second latch having a variable adjustment upon the face of the shutter, whereby it may be caused to engage either set of cam-stops, a cam effecting said adjustment, a third latch engaging the projecting cam-stops and provided with an arm at right angles to the inner face of the lens-plate, and a focusing-mirror having an arm which engages the arm on the third latch when the mirror has risen above the lens-opening, substantially as described.

9. In a photographic camera, the combination, with a circular shutter pivoted upon its center and having openings which coincide successively with the lens-opening, of a first holding or releasing latch engaging a cam-stop which extends to the edge of the shutter, a second latch pivoted like the first on the lens-plate, a cam adjusting said latch to lie more or less over the edge of the shutter, whereby it may engage the cam-stops extending to the edge of the shutter and may miss alternate cam-stops which are set back from the edge, or vice versa, a third latch engaging the latter cam-stops only and having an arm, a focusing-mirror pivoted in the box and thrown up by suitable means and locked down by a latch, a bell-crank lever pivoted on the lens-plate and having at one end an arm which underlies and releases the mirror-latch, the other end of said lever being operated by the cam-stops, and means for revolving the shutter, the mirror having an arm which strikes the arm on the third latch and withdraws it from engagement with the cam-stops, substantially as described.

10. In a photographic camera, the combination, with an inclined spring-raised focusing-mirror, of a lens-plate having a shutter, means for moving said shutter upon the release of a latch, and a releasing device actuated by the shutter and tripping the latch of the mirror, substantially as described.

11. In a photographic camera, the combination, with an inclined spring-raised focusing-mirror, of a rotary shutter, a spring-drawn chain or cord for rotating the same, a spring-pressed latch for arresting and releasing the shutter, a spring-latch for locking the mirror, and a gravitating lever operated by the shutter to release the latch and allow the mirror to rise, substantially as described.

12. In a photographic camera, the combination, with an inclined focusing-mirror held by a spring-latch and raised by one or more springs, of a rotary shutter, means for turning said shutter in one direction, a lever operated by the shutter to release the latch of the mirror, and one or more latches arresting the shutter at stated points, said latches being operated upon the outside of the camera, substantially as described.

13. In a photographic camera, the combination, with the camera-box, of a ground-glass screen, a focusing-mirror pivoted at one end at the rear of the box, a transverse support with which the free end of the mirror makes a close contact to form a dark-box in the rear, means operated from the outside for inclining said mirror, a latch for locking the mirror in an inclined position, and mechanism for automatically releasing the mirror-locking latch to permit the mirror to rise, substantially as described.

14. In a photographic camera, the combination, with a dark-box closed by a spring raised and inclined focusing-mirror, of a latch holding the mirror, a lens-plate having a shutter having openings and cam-stops between said openings, two opposite cam-stops extending to the edge of the shutter and the two others to a point short of the edge, means for revolving said shutter, a first spring-latch holding the shutter at its initial point, a second spring-latch arresting it at the point where the object is focused, a cam adjusting said second latch for time or instantaneous exposure, a third latch engaging only the cam-stops which extend to the edge of the shutter, said latch being withdrawn from engagement with the cam-stops by the rise of the mirror, and a lever pivoted on the lens-plate and operated by the cam-stops on the shutter to release the mirror, substantially as described.

15. In a photographic camera, a revolving shutter having a spool or pulley loosely mounted on its axis and connected to the shutter by a pawl on the latter engaging notches on the inner flange of the spool, a chain or similar device winding in a groove on said spool, a separate chain or other device winding or working in an opposite direction on the spool and connected with a lever pivoted on an axis on the lens-plate and extending through the latter, and a lever mounted on said axis outside the lens-plate and swinging between stops, whereby the spring actuating the shutter may be put under tension, substantially as described.

In testimony whereof I have affixed my signature in presence of two witnesses.

ENOCH WOOD PERRY, Jr.

Witnesses:
   A. H. NORRIS,
   JAMES A. RUTHERFORD.